United States Patent [19]

Melody

[11] Patent Number: 4,539,146

[45] Date of Patent: Sep. 3, 1985

[54] ELECTROLYTE FOR ELECTROLYTIC CAPACITORS

[75] Inventor: Brian Melody, Greencastle, Ind.

[73] Assignee: Emhart Industries, Inc., Indianapolis, Ind.

[21] Appl. No.: 639,749

[22] Filed: Aug. 13, 1984

[51] Int. Cl.³ .............................................. H01G 9/00
[52] U.S. Cl. .................................................. 252/62.2
[58] Field of Search ........................ 252/62.2; 317/230

[56] References Cited

U.S. PATENT DOCUMENTS

| | | | |
|---|---|---|---|
| 1,607,075 | 11/1926 | Hall | 252/62.2 |
| 2,862,157 | 11/1958 | Haring | 252/62.2 |
| 2,977,514 | 3/1961 | Myers | 252/62.2 |

Primary Examiner—John F. Niebling
Attorney, Agent, or Firm—Robert F. Meyer

[57] ABSTRACT

An electrolyte for an electrolytic capacitor includes a mixture of about 10 grams of boric acid mixed with about 1 liter of a 38% sulfuric acid solution.

5 Claims, 1 Drawing Figure

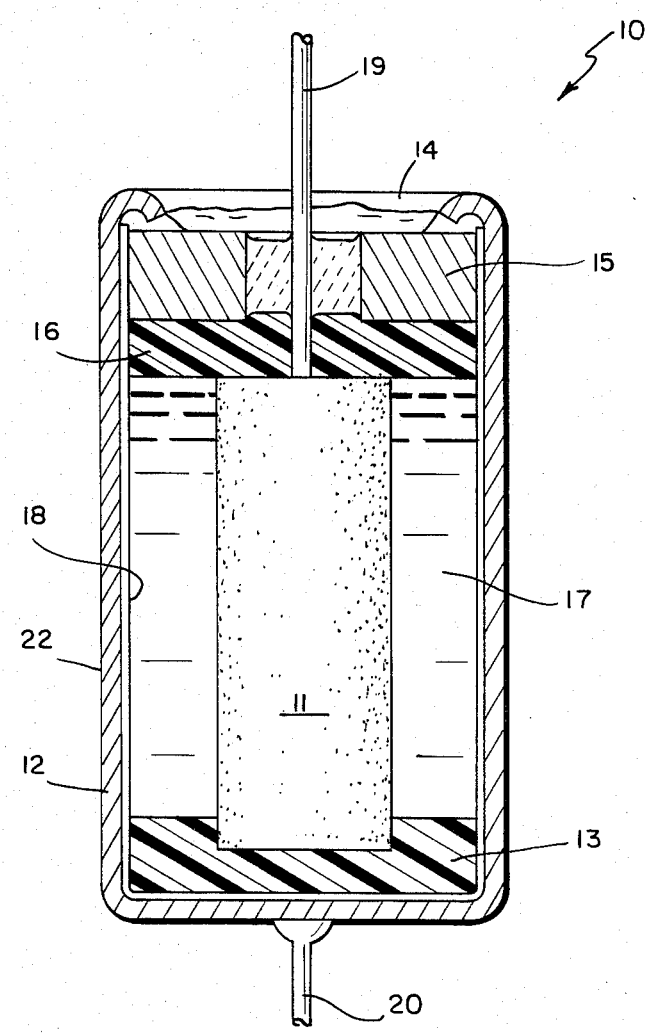

ELECTROLYTE FOR ELECTROLYTIC CAPACITORS

The present invention relates to electrical devices, and more particularly to electrolytes for use in electrolytic, dielectric oxide film forming metal anode capacitors and the like.

Electrolytic capacitors of the sintered dielectric film-forming metal anode type generally consist of a cathode electrode, an electrically conductive electrolyte, and a porous anode with a dielectric oxide film formed thereon. Typically, the cathode electrode is composed of silver, an alloy of silver, copper, or an alloy of copper to impart high electrical conductivity and corrosion resistance. The electrolyte is usually an aqueous solution of an inorganic acid, and the anode is composed of a film forming metal such as tantalum, aluminum, or niobium, preferably tantalum.

Sulfuric acid has commonly been used as the electrolyte in such capacitors. It has been found when current is supplied suddenly such as when there is a surge current or a ripple current, or whenever an overvoltage condition occurs, such capacitors exhibit anode spark. This often leads to a general degeneration of the capacitor due to oxide degradation and gas production produced by the sparking. Numerous efforts have been made to try to improve the stability of such capacitors.

An object of the present invention to provide an electrolyte that increases the resistance to overvoltage in electrolytic capacitors.

Another object of the invention to provide an electrolyte that inhibits gas production in electrolytic capacitors.

Yet another object of the present invention to provide an electrolyte that does not impede the low temperature performance of the electrolytic capacitor.

According to the present invention, an electrolyte for an electrolytic capacitor includes a solution of boric acid and sulfuric acid. Further in accordance with the present invention, an electrolyte for an electrolytic capacitor includes preferably from about 0.05 mol/lit to about 0.30 mol/lit boric acid and about 3.0 mol/lit to about 4.5 mol/lit sulfuric acid, and optimally from about 0.10 mol/lit to about 0.20 mol/lit boric acid and 3.4 mol/lit to about 4.1 mol/lit sulfuric acid. The solution may also contain a gelling agent or agents such as silica.

Other features and advantages of the present invention will be apparent from the following description of the preferred embodiment representing the best mode of carrying out the invention as presently perceived, which description should be considered in conjunction with the accompanying drawing in which the Figure is a sectional view of a electrolytic, film-forming metal anode capacitor of the type employing the electrolyte of the present invention.

In the illustrative embodiment, the electrolyte of the present invention includes a mixture of boric acid and sulfuric acid solution. It may be appreciated that similar advantages to those derived by the addition of boric acid to sulfuric acid can be attained by the use of various borates, biborates, pentaborates, particularly the ammonium borates, biborates and pentaborates.

It is believed that the mixture of boric acid with sulfuric acid facilitates in increasing the voltage at which anode sparks are likely to occur Thus the capacitor is able to withstand higher voltage surges than was heretofore possible. By withstanding these higher voltages, the tendency of the capacitor to spark with the resulting oxide degradation and gas production is greatly diminished. These advantages are achieved without impeding the low temperature performance of the capacitor as occurs, for instance, when phosphoric acid is added to sulfuric acid to raise the sparking voltage of a capacitor. The mixture of boric acid and sulfuric acid produces little to no difference in the dissipation factor of the capacitor at low temperatures.

The electrolyte of the present invention includes 10 grams of boric acid mixed with 1 liter of a 38% sulfuric acid solution. The acid solution includes 38% by volume sulfuric acid and the remainder water specific gravity 1.280 @20° C. prior to boric acid addition. The relationship of boric acid and sulfuric acid to the total mixture can best be expressed in a common denominator as follows: from about 0.05 to about 0.3 mol/lit boric acid and from about 3.0 to about 4.5 mol/lit sulfuric acid. Preferably the mixture comprises from about 0.10 to about 0.2 mol/lit boric acid and from about 3.4 to about 4.1 mol/lit sulfuric acid.

A 38% sulfuric acid solution has the following properties:
Resistance at 1000 HZ: 1.5 ohms $cm^{-2}$
Breakdown voltage with 100 volts formation: 108 volts In comparison, the electrolyte of the present invention has the following properties:
Resistance at 1000 HZ: 1.7 ohms $cm^{-2}$
Breakdown voltage with 100 volts formation: 122 volts Referring to FIG. 1, the typical wet slug capacitor 10 that utilizes an electrolyte of the present invention includes a dielectric oxide film-forming metal anode 11 with anode riser 19. The anode 11 has a dielectric oxide film or layer over its surface. In combination with anode 11 is cathode electrode 12 which also serves as the housing or case 22 for capacitor 10. The anode 11 is retained within the cathode housing 12 by means of the insulative bottom spacer 13 and end seal assembly 14. End seal assembly 14 is shown as a glass-to-metal seal 15 in conjunction with a resilient washer 16. The electrolyte 17 of the present invention contacts the anode 11 and the interior surface coating 18 of the cathode electrode 12. External electrical terminal of the cathode is provided by cathode lead 20.

The anode 11 is composed of a dielectric oxide film-forming metal such as tantalum, or niobium, or alloy of the two, preferably tantalum.

The following tests were conducted to determine the stability of capacitors manufactured utilizing an electrolyte made in accordance with the present invention in comparison to capacitors manufactured utilizing only a 38% by weight sulfuric acid solution as the electrolyte.

The capacitors were rated at 1.2μF/125 VDC and utilized a tantalum anode and a silver cathode. The average capacitance (CAP), the dissipation fact (DF), and the direct current loss (DCL) were determined for each capacitor. Forty-two units were manufactured utilizing the electrolyte of the present invention, and forty one units were manufactured utilizing only 38% by weight sulfuric acid. These capacitors were subjected to an overnight burn-in at 125 volts. The results of these tests are contained in Table I.

TABLE I

| | 38% $H_2SO_4$ | | | 38% $H_2SO_4$ + $H_3BO_4$ | | |
|---|---|---|---|---|---|---|
| SAMPLE | DCL | CAP | DF | DCL | CAP | DF |
| 1 | .06 | 1.18 | .4 | .05 | 1.18 | .5 |

TABLE I-continued

| | 38% H₂SO₄ | | | 38% H₂SO₄ + H₃BO₄ | | |
|---|---|---|---|---|---|---|
| SAMPLE | DCL | CAP | DF | DCL | CAP | DF |
| 2 | .05 | 1.17 | .5 | .08 | 1.18 | .5 |
| 3 | .07 | 1.22 | .8 | .06 | 1.14 | .8 |
| 4 | .05 | 1.17 | .5 | .05 | 1.17 | .4 |
| 5 | .17 | 1.19 | .7 | .16 | 1.18 | 1.0 |
| 6 | 1.2 | Short | | .22 | 1.16 | .4 |
| 7 | .09 | 1.17 | .8 | .06 | 1.17 | .5 |
| 8 | 28.5 | Short | | .32 | 1.17 | .6 |
| 9 | .08 | 1.16 | .6 | .05 | 1.17 | .5 |
| 10 | .06 | 1.16 | .5 | .04 | 1.18 | .8 |
| 11 | .72 | 1.15 | .4 | .62 | 1.16 | .9 |
| 12 | .03 | 1.17 | .5 | .04 | 1.16 | .5 |
| 13 | .09 | 1.17 | 1.0 | .05 | 1.16 | .8 |
| 14 | .05 | 1.16 | .6 | .04 | 1.15 | .5 |
| 15 | .06 | 1.18 | .5 | .06 | 1.14 | .8 |
| 16 | .03 | 1.15 | .8 | .04 | 1.67 | .4 |
| 17 | .02 | 1.17 | .5 | .06 | 1.17 | .8 |
| 18 | .04 | 1.19 | .7 | .02 | 1.17 | .5 |
| 19 | .05 | 1.07 | .9 | .11 | 1.70 | .4 |
| 20 | .06 | 1.20 | .8 | .03 | 1.16 | .5 |
| 21 | .08 | 1.17 | .4 | .08 | 1.18 | .8 |
| 22 | .05 | 1.14 | .9 | .03 | 1.18 | .7 |
| 23 | .05 | 1.16 | .6 | .11 | 1.17 | .5 |
| 24 | .04 | 1.15 | .4 | .06 | 1.17 | .5 |
| 25 | .10 | 1.18 | .6 | .19 | 1.16 | .5 |
| 26 | .26 | 1.18 | .6 | 15.9 | Short | |
| 27 | .06 | 1.17 | .5 | .06 | 1.17 | .5 |
| 28 | .31 | 1.17 | .4 | .33 | 1.17 | .9 |
| 29 | .05 | 1.14 | .5 | .05 | 1.16 | .6 |
| 30 | .13 | 1.16 | .6 | .05 | 1.15 | .9 |
| 31 | .79 | 1.16 | .8 | .05 | 1.18 | .8 |
| 32 | .02 | 1.20 | .5 | .11 | 1.12 | .7 |
| 33 | .07 | 1.16 | .6 | .04 | 1.18 | .7 |
| 34 | .04 | 1.16 | .4 | .09 | 1.17 | .9 |
| 35 | .30 | 1.17 | .9 | .03 | 1.16 | .9 |
| 36 | .02 | 1.16 | 1.0 | .04 | 1.21 | .8 |
| 37 | .89 | 1.18 | .4 | .10 | 1.17 | .5 |
| 38 | .07 | 1.15 | .4 | .06 | 1.17 | .6 |
| 39 | .04 | 1.19 | .9 | .05 | 1.20 | .5 |
| 40 | .03 | 1.17 | 1.0 | .03 | 1.21 | .9 |
| 41 | short | | | .14 | 1.13 | 1.1 |
| 42 | | | | .09 | 1.17 | .6 |

The average capacitance of the units utilizing only sulfuric acid was 1.17 f, the dissipation factor (DF) was 0.74%, and the direct current leakage (DCL) was 0.14 microamps. There were three shorts in the capcitors using only sulfuric acid. The average capacitance (CAP) of the capacitors utilizing the electrolyte of the present invention was 1.19 f, the dissipation factor (DF) was 0.65%, and the direct current leakage (DCL) was 0.09 microamps. There was only one short in the capacitors using the electrolyte of the present invention. It can be seen from this data that the operating characteristics of capacitors using the electrolyte of the present invention are superior to capacitors utilizing only 38% by weight sulfuric acid.

The aforementioned capacitors were then subjected to an overnight burn-in at 150 volts i.e. 38 units including only sulfuric acid and 41 units including the electrolyte of the present invention. It was found that in the capacitors utilizing only 38% by weight sulfuric acid, 30 shorts occurred out of the 38 units. For the capacitors utilizing the electrolyte of the present invention there were only 12 shorts out of the 41 units. Thus 21% of the capacitors using only sulfuric acid did not short while 71% of the capacitors using the electrolyte of the present invention did not short. Further, 6 units out of the 38 using only the sulfuric acid had a direct current leakage (DCL) of less than 1 microamp, while 26 units out of the 41 using the electrolyte of the present invention had a direct current leakage (DCL) of less than 1 microamp. Once again, it can be seen from this data that capacitors utilizing the electrolyte of the present invention have superior performance characteristics than those simply using a 38% sulfuric acid solution.

Tests were conducted to determine whether or not capacitors utilizing the electrolyte of the present invention had a higher breakdown voltage. Capacitors were formed utilizing a 1 gram anode from N.R.C SGQ 10 tantalum with a rating of 2,000 CV/gram anodized to 180 volts in phosphoric acid. Such capacitors would have a rating of 1.1µF/100 Volts D.C. The assembled capacitors were then subjected to overvoltage to determine the breakdown voltage. The results of these tests are contained in Table II.

TABLE II

| 38% H₂SO₄ | 38% H₂SO₄ + H₃BO₄ |
|---|---|
| (1) 120 volts | (1) 125 volts |
| (2) 118 volts | (2) 123 volts |
| (3) 121 volts | (3) 135 volts |
| | (4) 130 volts |
| Avg. 119–120 volts | Avg. 128–129 volts |

It can be seen from the data that the capacitors utilizing 38% by weight sulfuric acid broke down at an average of 119 to 120 volts while capacitors utilizing the electrolyte of the present invention broke down at an average of 128 to 129 volts. This elevated breakdown voltage assures that the capacitor can resist a higher level of surge currents or ripple currents, which may cause overvoltage, without breakdown. By increasing the breakdown voltage, the production of gases within the capacitor is greatly decreased as the sparking conditions that usually exist during overvoltage are not present to liberate the gas.

It should also be noted that the addition of boric acid to sulfuric acid produces little to no difference in the dissipation factor of the capacitor at low temperature. It has been known that the addition of phosphoric acid raises the capacitor resistance to sparking voltage, but the addition of phosphoric acid has also led to a decrease in performance at low temperature particularly an increase in the dissipation factor. The addition of boric acid does not impede the low-temperature performance whatsoever.

The above description of the present invention is intended to be taken in an illustrative and not a limiting sense. Various modifications and changes may be made to the described embodiments by a person skilled in the art without departing from the scope of the appended claims.

What is claimed is:

1. An electrolyte consisting of a liquid solution of from about 3.0 to about 4.5 mol/lit sulfuric acid and from about 0.05 to about 0.30 mol/lit boric acid.

2. The electrolyte of claim 1 wherein the sulfuric acid is from about 3.4 to about 4.1 mol/lit and the boric acid is from about 0.1 to about 0.2 mol/lit.

3. An electrolyte for use in an eletrolytic capacitor having an anode composed of a dielectric oxiode film-forming metal consisting of a liquid solution of from about 3.0 to about 4.5 mol/lit sulfuric acid and from about 0.5 to about 0.30 mol/lit boric acid.

4. The electrolyte of claim 3 wherein the sulfuric acid is from about 3.4 to about 4.1 mol/lit sand the boric acid is from about 0.1 to about 0.2 mol/lit boric acid.

5. The electrolyte of claim 4 wherein the dielectric oxide film-forming metal is tantalum.

* * * * *